United States Patent [19]

Mannava et al.

[11] Patent Number: 4,551,018
[45] Date of Patent: Nov. 5, 1985

[54] ACOUSTIC EMISSION ANALYZER

[75] Inventors: Seetha R. Mannava, Latham; John F. McDonald, Clifton Park; Henry A. Scarton, Troy, all of N.Y.

[73] Assignees: General Electric Co., Schenectady; Rensselaer Polytechnic Institute, Troy, both of N.Y.

[21] Appl. No.: 430,900

[22] Filed: Sep. 30, 1982

Related U.S. Application Data

[63] Continuation-in-part of Ser. No. 426,400, Sep. 29, 1982, which is a continuation-in-part of Ser. No. 239,704, Mar. 2, 1981, abandoned.

[51] Int. Cl.$^4$ ............ G01P 3/36; G01B 9/02; G01N 21/41; G01N 29/04
[52] U.S. Cl. ..................... 356/28.5; 73/657
[58] Field of Search ........... 356/28.5; 73/657; 350/162.23

[56] References Cited

U.S. PATENT DOCUMENTS 3,419,330 12/1968 Schneider ............ 356/28.5
3,604,804 9/1971 Penney et al. ......... 356/28.5
3,687,517 8/1972 Brun ................... 356/28.5

OTHER PUBLICATIONS

M. K. Mazumder, Applied Physics Letters, vol. 16, #11, p. 462.
. L. Whitman et al., Applied Optics, vol. 8, #8, 8-1969, p. 1567.

Primary Examiner—S. C. Buczinski
Attorney, Agent, or Firm—John F. Ahern; Paul Checkovich

[57] ABSTRACT

A periodic structure such as a diffraction grating is disposed on the surface of an object from which acoustic emissions are to be detected. A plane monochromatic light beam is incident on the periodic structure and forms a number of Bragg diffraction orders at predetermined angles. A detector positioned to intercept one of the diffraction orders receives light whose frequency has been Doppler shifted by surface motion on the object. A reference beam, also incident on the detector heterodynes with the Doppler-shifted beam so that the Doppler component can be recovered. In one embodiment, the reference beam is also incident on the surface and itself produces Bragg diffraction orders. The geometry produces up Doppler in the Bragg diffraction orders from one beam and down Doppler from the Bragg diffraction orders from the other beam and selected Bragg diffraction orders from both beams are heterodyned in the detector.

18 Claims, 10 Drawing Figures

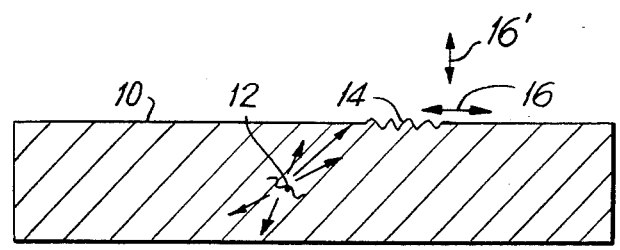
FIG. 1
FIG. 3
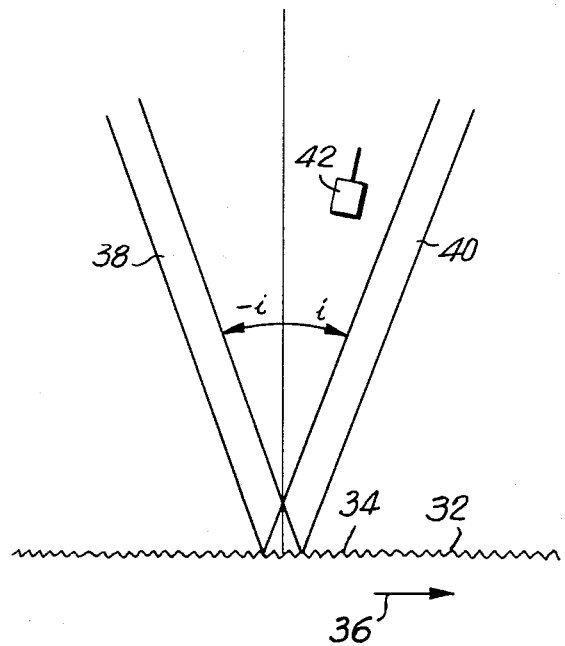

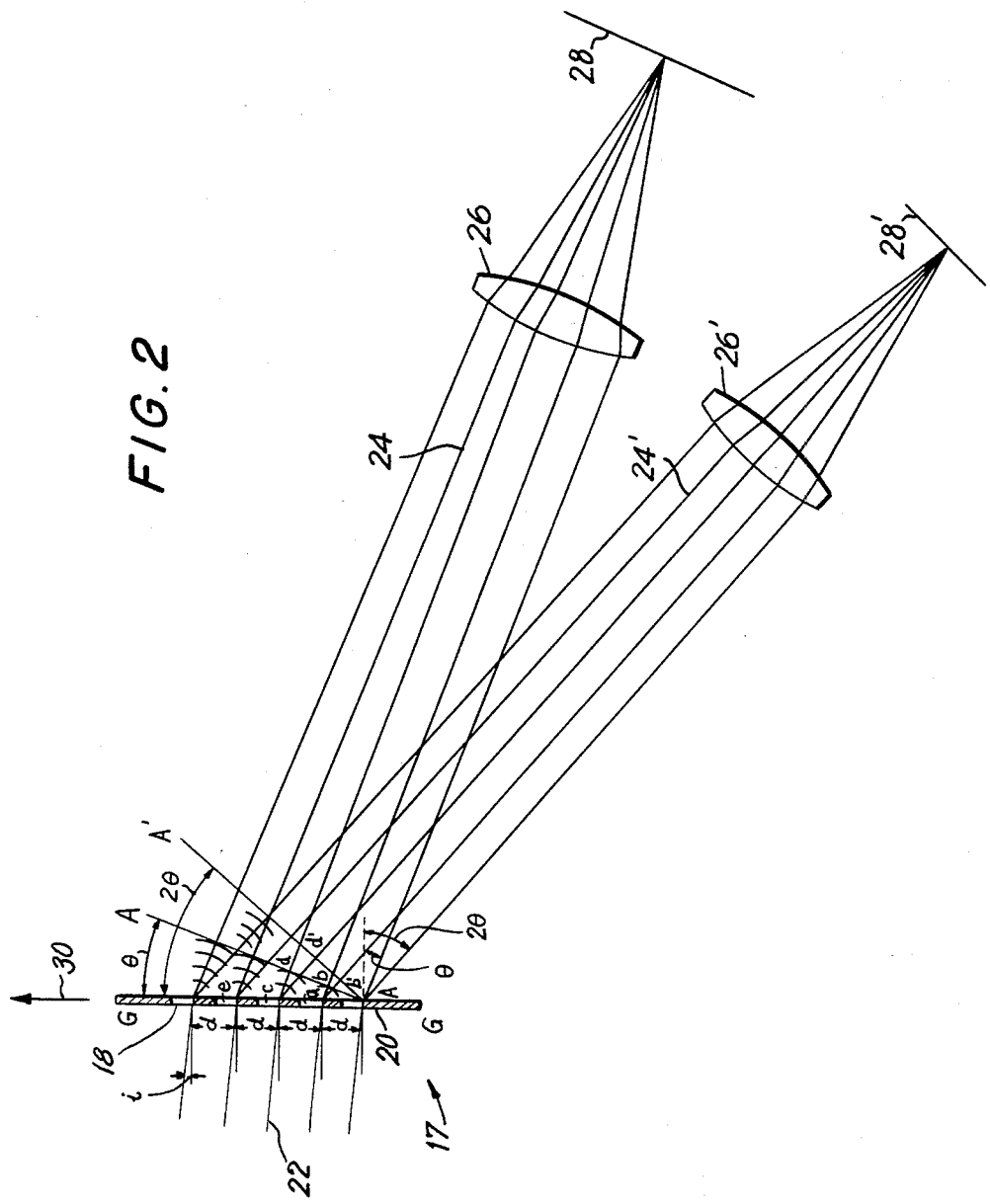

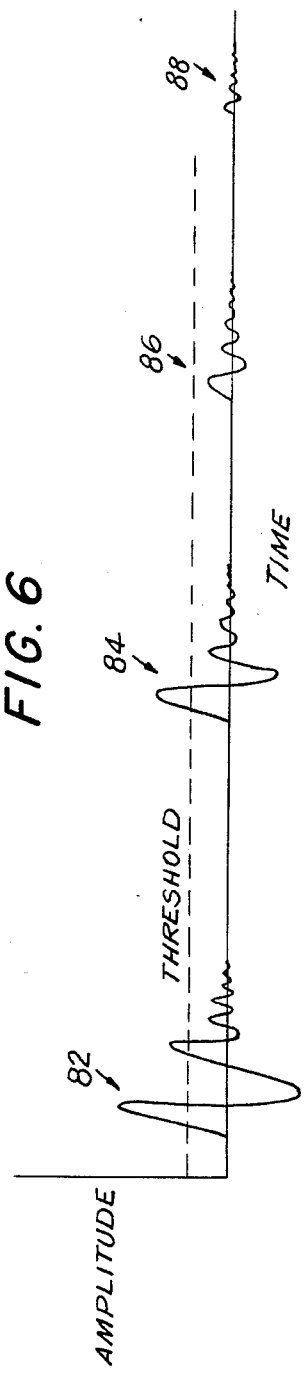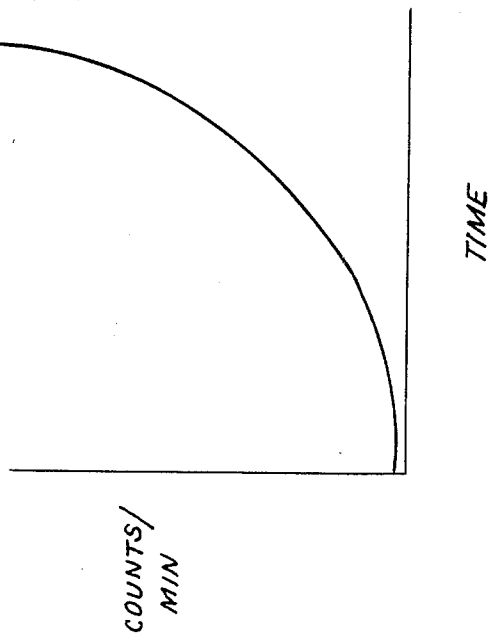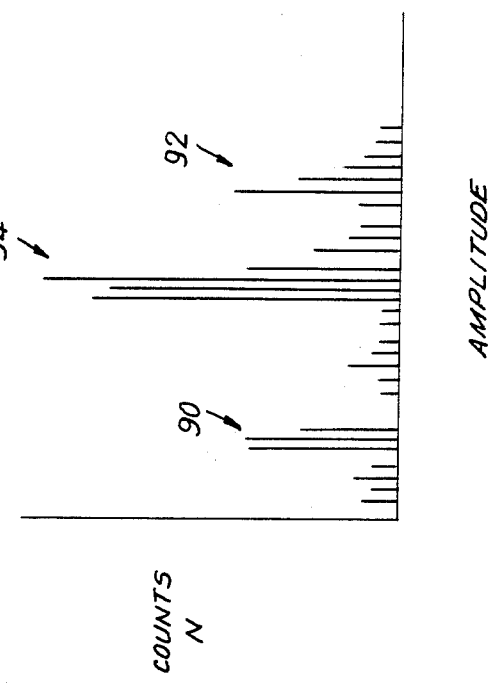
FIG. 6
FIG. 7
FIG. 8

ACOUSTIC EMISSION ANALYZER

This application is a Continuation-in-Part of our co-pending U.S. patent application Ser. No. 426,400, filed 9/29/82, the disclosure of which is incorporated herein by reference and which is a Continuation-in Part of U.S. patent application Ser. No. 239,704, filed Mar. 2, 1981, now abandoned and commonly assigned.

BACKGROUND OF THE INVENTION

The present invention is related to the detection of internal structural changes in an object and, more particularly, internal structural changes which may result in failure of the object. More particularly, the present invention is concerned with detecting acoustic emissions produced by fracture, grain boundary shift and the like, in an object particularly when under stress.

When a stationary or moving object is stressed, internal irreversible changes can occur in the grain structure or in the gross structure of the body. In a shaft conveying a torque, for example, a sudden rearrangement of material domains can occur randomly and irreversibly from the stress. These occurrences give rise to acoustic emissions which are similar to tiny earthquakes typically originating within the body of the material and being transmitted to the surface. At the surface, longitudinal and transverse waves interact to produce surface waves.

Knowledge of the acoustic emissions detectable from the surface waves can give insight into the response of the internal structures to stress. In particular, the frequency of occurrence of acoustic emissions can give advance warning of impending failure or the need for preventive maintenance.

Acoustic emissions contain frequencies from the audible (below 10 kHz) to the hundreds of MHz. Most of the emissions range in frequency up to about 5 MHz and involve motion over dimensions on the order of up to about 10 Angstroms (1 Angstrom equals $10^{-10}$ meters) By comparison, the wavelength of visible light ranges from 4,000 to about 7,500 Angstroms or, roughly, 400 to 750 times greater than the surface displacement due to acoustic emissions.

In the prior art, acoustic emissions are detected by piezoelectric transducers firmly clamped to the surface. The necessity for clamping the transducers to the surface, of course, disturbs the waves being measured and distorts the signals. In addition, such piezoelectric transducers are high Q devices which add their own resonances to the signal.

A method of measuring small surface displacements without surface contact or sensor resonance would be desirable in order to avoid disturbing the waves being measured. One such method is a capacitive technique where one plate of the sensor is the metal specimen wall and the other is an electrode a short distance away. This sensor has the advantage of wide band width by eliminating sensor resonance and the disadvantage of difficulty of application and fragility. Another such method which has successfully been employed is optical interferometry in which a specularly reflecting surface ground flat to within a very small fraction of a wavelength of light is placed on the surface and a monochromatic beam of light reflected from the specular refector is combined with a reference beam. Optical interference fringes thus developed are translated by change in path length of the beam reflected from the specular reflector due to motion of the surface in the normal direction.

Interferometer techniques have at least two problems. One is that the measurement requires extreme stability of all of its parts and thus must be done on a very sturdy and stable optical bench. Normal motion on the order of a fraction of a wavelength of the light beam is enough to make measurement impossible. In addition, interferometry is only sensitive to motion normal to the surface and is incapable of providing information about transverse surface motion.

U.S. Pat. No. 3,604,804 discloses apparatus for measuring the Doppler component in light reflected from a moving surface. The reflected light, resembling speckles, results from the impingement of a laser beam on a rough surface. The speckles on the surface appear to move with a band of velocities centered on the actual velocity of the object. Suitable processing can be employed to derive the actual velocity from the band of signal components.

The above-referenced patent does not provide a Doppler signal with sufficient purity to detect surface motion on the order of those expected in acoustic emissions.

OBJECTS AND SUMMARY OF THE INVENTION

Accordingly, it is an object of the present invention to provide a non-contacting apparatus for measuring surface waves in an object resulting from acoustic emission.

It is a further object of the invention to provide a non-contacting apparatus for measuring surface waves in an object which, itself, is in gross motion.

It is a further object of the invention to provide apparatus and method for detecting surface waves in a body resulting from internal changes giving rise to acoustic emissions.

It is a further object of the invention to provide apparatus and method for detecting surface motion resulting from acoustic emissions on the surface of a stationary body.

It is a further object of the invention to provide apparatus and method for analyzing a Doppler signal reflected in a Bragg order refraction from a stationary surface to detect surface motion arising from internal acoustic emissions in the body.

It is a further object of the invention to provide apparatus and method for non-contact detection of surface motion arising from acoustic emissions within a body wherein the body itself if in gross motion.

It is a further object of the invention to provide apparatus and method for demodulating a combined Doppler signal resulting from gross motion of a body frequency modulated by surface motion resulting from acoustic emissions within the body.

It is a further object of the invention to provide means for demodulating a combined Doppler signal containing an average Doppler resulting from gross motion of a body and a superimposed frequency modulation caused by surface motion resulting from internal acoustic emission.

It is a further object of the invention to provide an optical Doppler motion detection system for detecting Doppler due to surface waves resulting from internal acoustic emissions which employs a zero crossing detector to detect such surface motion.

According to one embodiment of the invention there is provided an apparatus for sensing acoustic emissions resulting in surface motion of a body comprising a periodic grating-like structure on the surface, the grating-like structure being effective to provide a plurality of Bragg diffraction orders in response to an incident light beam, means for impinging a first beam of monochromatic light on the grating-like structure, a detector positioned to intercept at least one of the Bragg diffraction orders, means for providing a reference beam of monochromatic light to the detector, the reference beam heterodyning with the first beam in the detector whereby a Doppler frequency in the at least one Bragg diffraction order resulting from motion of the surface is detected, and means for measuring the surface motion produced by the acoustic emissions.

According to another embodiment of the invention, there is provided an apparatus for sensing acoustic emissions resulting in surface motion of a stationary body comprising a periodic grating-like structure on the surface, the grating-like structure being effective to provide a plurality of Bragg diffraction orders in response to an incident light beam, means for impinging a first beam of monochromatic light on the grating-like structure, a detector positioned to intercept at least one of the Bragg diffraction orders, means for providing a reference beam of monochromatic light to the detector, the reference beam heterodyning with the first beam in the detector whereby a Doppler frequency in the at least one Bragg diffraction order resulting from motion of the surface is detected, and a zero crossing detector effective to produce a signal each time an output of the detector crosses zero.

According to a further feature of the invention, there is provided an apparatus for sensing acoustic emissions resulting in surface motion of a body, the body being movable at an average speed comprising a periodic grating-like structure on the surface, the grating-like structure being effective to provide a plurality of Bragg diffraction orders in response to an incident light beam, means for impinging a first beam of monochromatic light on the grating-like structure, a detector positioned to intercept at least one of the Bragg diffraction orders, means for providing a reference beam of monochromatic light to the detector, the reference beam heterodyning with the first beam in the detector whereby a Doppler frequency in the at least one Bragg diffraction order resulting from motion of the surface is detected, the average speed providing a first Doppler frequency in an output of the detector, surface motion resulting from acoustic emissions providing a second Doppler frequency which frequency modulates the first Doppler frequency in the output of the detector and means for demodulating the output of the detector to recover the second Doppler frequency.

According to a further feature of the invention, there is provided a method for measuring acoustic emissions resulting in surface motion of a body, comprising disposing a periodic grating-like structure on the surface, the grating-like structure being effective to provide a plurality of Bragg diffraction orders in response to an incident light beam, impinging a first beam of monochromatic light on the grating-like structure to produce the plurality of Bragg diffraction orders, positioning a detector to intercept at least one of the Bragg diffraction orders, deriving a reference beam from the first beam, heterodyning the intercepted Bragg diffraction order with the reference beam to produce a Doppler signal responsive to the surface motion, and measuring the surface motion in response to the Doppler signal.

According to a further feature of the invention there is provided a method for measuring acoustic emissions resulting in surface motion of a surface of a body, the surface being movable at an average speed, comprising disposing a periodic grating-like structure on the surface, the grating-like structure being effective to provide a plurality of Bragg diffraction orders in response to an incident light beam, impinging a first beam of monochromatic light on the grating-like structure to produce the plurality of Bragg diffraction orders, positioning a detector to intercept at least one of the Bragg diffraction orders, deriving a reference beam from the first beam, heterodyning the intercepted Bragg diffraction order with the reference beam to produce a first Doppler signal responsive to the average speed and a second Doppler signal frequency modulating the first Doppler signal responsive to surface motion resulting from acoustic emission, demodulating the heterodyned signal to recover an acoustic emission signal related to the second Doppler signal and measuring the surface motion based on the acoustic emission signal.

Briefly described in accord with the present invention we provide a means for detecting and measuring acoustic emission of a stationary or moving body, utilizing in a preferred embodiment, the heterodyning of the light resulting from Doppler shifts of dual laser beams which simultaneously impinge at selected angles upon a single point on a chosen surface. The Doppler shifts with which the present invention is concerned are caused by the effect of acoustic emission caused surface motion within a micro-optical (measurement volume) surface location.

DESCRIPTION OF THE DRAWINGS

The novel features believed characteristic of the present invention are set forth in the appended claims. The invention itself, together with further objects and advantages thereof, may best be understood with reference to the following detailed description, taken in connection with the appended drawings, in which:

FIG. 1 is a cross section of a body showing the generation and propagation of acoustic emissions and the resulting surface motion;

FIG. 2 is a schematic cross section of a transmission type diffraction grating to which reference will be made in describing the generation of Bragg diffraction orders.

FIG. 3 is a schematic diagram showing a dual beam embodiment of the invention;

FIG. 6 is a graph illustrating one possible form that may be taken by surface waves resulting from a single acoustic emission event;

FIG. 7 is a graph relating counts per minute versus time to which reference will be made in explaining the utility of the invention.

FIG. 8 is a histogram illustrating a trimodal distribution of counts versus amplitude;

DETAILED DESCRIPTION OF THE INVENTION

Figure 4:
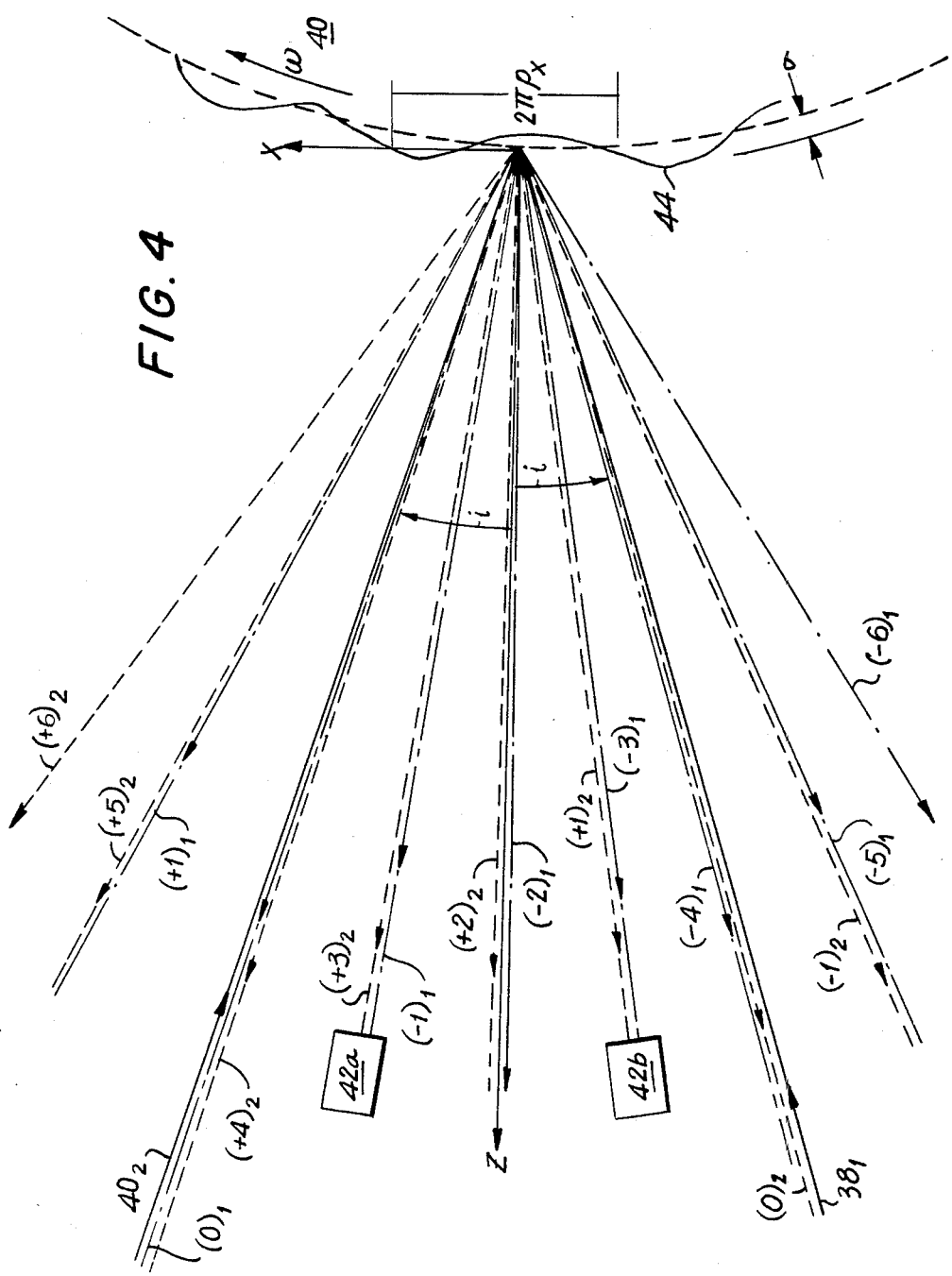
FIG. 4 is a schematic diagram illustrating the development of Bragg orders on a periodic surface and their detection by suitably placed detectors.

Referring to FIG. 1, a body 10 is shown which may be under stress. Due to the stress, a fracture or grain boundary shift at an internal location 12 produces an acoustic emission which propagates outward from location 12 toward a surface 14. Upon reaching surface 14, the acoustic emission produces combinations of surface waves with displacement both parallel to, and normal to surface 14. Displacement parallel to surface 14 is indicated by double-headed arrow 16. For purposes of example, the component of displacement parallel to surface 14 is used to describe the present invention in this application. Other motion such as simultaneously normal motion can be detected (double arrow 16').

Prior to the detailed description of the invention, a brief discussion of diffraction is provided to aid in an understanding of the invention.

Diffraction gratings fall into two general classifications, namely, transmission types and reflection types. In a transmission-type diffraction grating, a large number of fine, closely spaced transparent regions are separated by opaque regions. Light incident on a transmission diffraction grating passes through the transparent regions and is diffracted as will be explained. A reflection diffraction grating customarily includes a reflective surface having a large number of closely spaced parallel grooves. The undisturbed reflective surface acts analogously to the openings in the transmission diffraction grating to diffract the incoming light. Theoretically, either a transmission or reflective-type grating could be employed with the present invention. However, in practice, a reflection-type grating is preferred since such a grating can be applied to the surface of the object and a detector can be positioned outside the object. For purposes of illustration in the following, however, it is simpler to describe the principle in connection with a transmission grating.

Referring to FIG. 2, a diffraction grating 17 of the transmission-type includes a plurality of open lines 18 between opaque regions 20. Typically, diffraction grating 17 may be produced photographically on a transparent substrate (not shown) with opaque regions 20 formed by conventional photographic processes or by etching a large number (hundreds or thousands to the inch) of parallel lines in the surface of a glass substrate. Lines 18 are spaced a uniform distance d apart. A plane monochromatic light beam 22, incident on diffraction grating 17, passes through lines 18 and constructively and destructively interferes on the opposite side thereof. At a certain angle $\theta$, identified by line A—A, the light emerging from lines 24 constructively interferes since the distance from each line 18 to line A—A is equal to exactly one wavelength of the monochromatic light more or less than the distance from the adjacent line 24. The angle $\theta$ defines the first diffraction order which results in a parallel beam of light 24 which may be focused by a lens 26 on a surface 28. If diffraction grating 17 is stationary, the image on surface 28 has the same frequency and wavelength as incoming light beam 22. However, if diffraction grating 17 is in linear motion as shown by an arrow 30, a Doppler shift is seen in the light imaged on surface 28. The Doppler shift is related to the incidence angle i, the frequency or wavelength of incoming light beam 22 and the speed at which diffraction grating 17 moves by the equation (for the dual beam system only):

$$v(t) = \tfrac{1}{2}\lambda \nu_o(t)/\sin \theta i,$$

where: $\lambda$ = wavelength of the incident light,
$\nu_o(t)$ = speed of the motion of the diffraction grating,
$\theta_i$ = angle of incidence with respect to the surface normal. The point imaged on surface 28 is stationary but variable in frequency and wavelength in proportion to the speed of motion 30. It would be clear that if spacing d is changed, angle $\theta$ is correspondingly changed which results in the image on surface 28 being displaced to a different point.

A further angle at which constructive interference is produced is shown at an angle $2\theta$ indicated by a line A—A'. The path difference of light from each line 18 varies by a factor of two wavelengths from its neighbor. This gives rise to a second diffraction order in a beam 24' which may be focused by a lens 26' on a surface 28'. If diffraction grating 17 is in motion in direction 30, the change in frequency and wavelength of the light imaged on surface 28' is twice as great as the change in frequence and wavelength of the light imaged on surface 28. That is, the first order Doppler frequency is multiplied by an integer equal to the diffraction order. Third, fourth and higher orders are also produced with the intensity reducing as the order becomes higher.

In order to produce a signal proportional to the Doppler, incident light 22 may be heterodyned with the Doppler shifted light as disclosed in our copending application. Alternatively, a light beam may be split into two portions and both portions directed from different angles at the same point on diffraction grating 17 in such a way that diffraction orders resulting from the two beams may be imaged at a common point.

Referring now to FIG. 3, a surface 32 includes a diffraction grating 34 of the reflective type thereon with the lines parallel to the axis of the shaft. Surface 32 may be stationary or in motion as indicated by an arrow 36. A first monochromatic parallel beam 38 is incident on diffraction grating 34 at an angle $-i$ from a normal to surface 32. A second beam of monochromatic light 40 is incident from an angle $+i$ upon the same point on diffraction grating 34. When thus arranged, the zero diffraction order of each of beams 38 and 40 can be found along the axis of the other beam. Within the angle defined by $\pm i$, the diffraction orders produced by each of beams 38 and 40 have the opposite sign. That is, the Doppler produced by beam 38 is negative, that is, has a lower frequency than incident beam 38, whereas the Doppler produced by beam 40 is positive, that is, has a higher frequency than incident beam 40. Thus, a detector 42 properly positioned to intercept a diffraction order from each of the beams 38 and 40 diffracted by diffraction grating 34 on surface 32 will see a Doppler component which is the sum of multiples of the diffraction orders. That is, if the diffraction orders from beam 38 is $-1$ and the diffraction order from beam 40 is $+4$, the Doppler frequency which may be detected by detector 42 is five times the first order Doppler frequency.

Frequency components in parallel surface waves 16 of 5 MHz, for example, will produce peak velocities of $10^{-4}$ meters per second which is capable of producing a Doppler shift on the order of 100 to 1,000 Hz in a first order Bragg refraction beam using only a single laser. If paired laser beams such as shown in FIG. 3 are employed and, if an up Doppler is received as a result of beam 38 (a higher frequency than beam 38) and a down Doppler is received as a result of beam 40 (frequency lower than beam 40), the difference between the Doppler frequencies can be greater than either Doppler frequency alone. Thus, Doppler frequencies due to motion of diffraction grating 34 in a direction parallel to surface 32 and in the plane defined by beams 38 and 40 can be multiplied by a value equal to the sum of the up and down Dopplers. This may provide a Doppler multiple of from 2 to about 10 or more. Thus, the 100 to 1,000 Hz can be increased to 200 to 10,000 Hz and the Doppler frequencies can be relatively pure and responsive solely to motion of surface 32 without the overlapping or noisy Doppler which makes speckle velocity detection imprecise.

Referring now to FIG. 4, beams $38_1$ and $40_2$ impinge upon the same point on a surface 44, here represented as having a circular cross section, of a body 46 at approximately equal angles of incidence $\pm i$ with respect to the normal Z to the mean surface. With respect to FIG. 4, several things are worthy of note. For convenience, beam 38 is given the subscript 1, and beam 40 is given the subscript 2. Incident beams $38_1$ and $40_2$ are shown as solid lines. The reflected beams are shown as dashed lines. Dashed lines indicating reflections produced by incident beam $38_1$, are represented by alternating long and short dashes. The numeral within the parenthesis indicates the Bragg diffraction order and the subscript 1 indicates that the reflected beam results from incident beam $38_1$. Similarly, dashed lines indicating reflections produced by incident beam 40 are represented by uniform length dashes. The numbers in parentheses indicate the Bragg diffraction order and the subscript 2 indicates that the reflected beam results from incident beam $40_2$. At certain angles two or three beams are shown. With the geometry shown, the beams actually overlap one another but are shown slightly separated for purposes of illustration. Lastly, for reflected Bragg orders designated as $(+6)_2$ and $(-6)_1$ only one reflected beam is shown to suggest the fact that the beam strength drops off with increasing Bragg order.

Photodetector 26a receives reflected beams $(+3)$ and $(-1)_1$. Thus detector 42a receives a triply unshifted Doppler beam due to incident beam $40_2$ and a singly downshifted Doppler light beam due to incident beam $38_1$. Mixing or heterodyning in detector 42a of signals having frequencies of $\nu+3\nu_D$ and $\nu-\nu_D$ produces a difference frequency of $4\nu_D$. The difference frequency is higher than the Doppler frequency resulting from either of the incident beams $38_1$ and $40_2$. Outside the region between beams $38_1$ and $40_2$, the Doppler shifts resulting from both beams are of the same sign and thus heterodyning them creates a Doppler signal having a frequency proportional to the difference between the Bragg orders.

Figure 5:
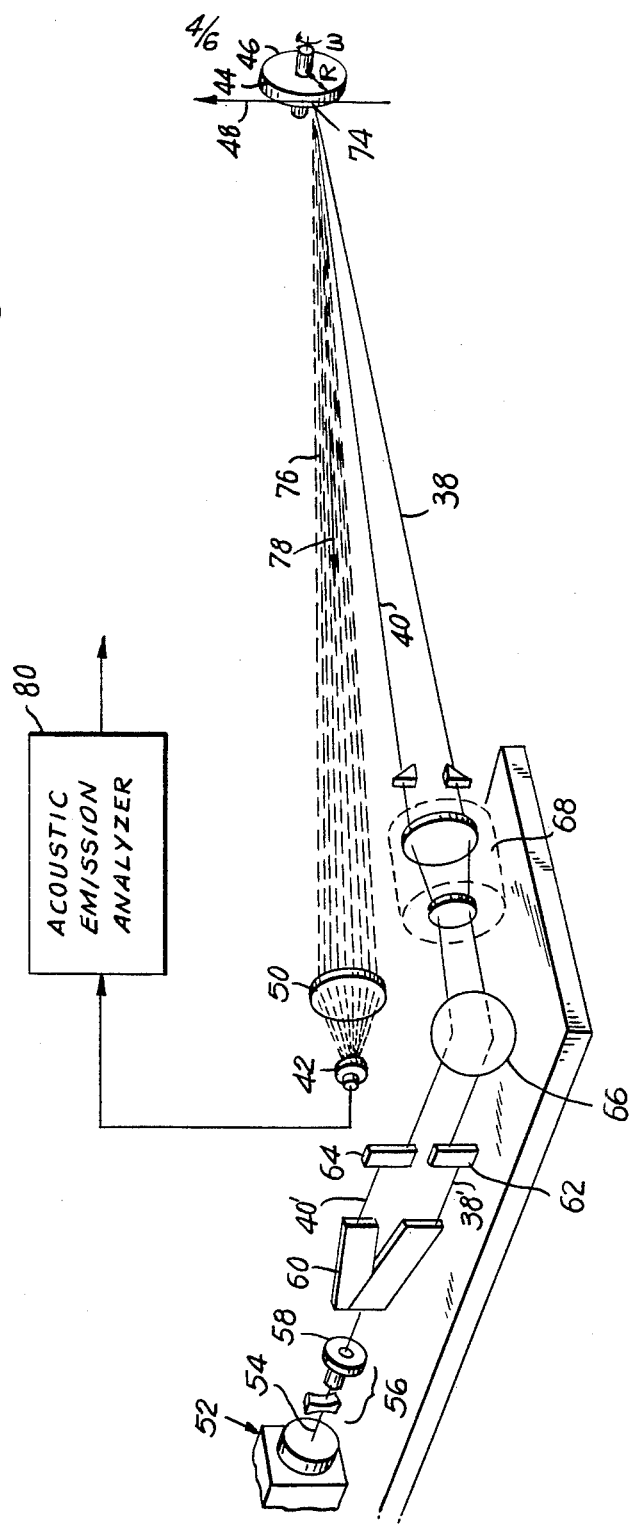
FIG. 5 is a perspective schematic view of a system for detecting and analyzing acoustic emissions.

Referring now to FIG. 5, beams 38 and 40 impinge on grating surface 44 on body 46. Body 46 may be stationary or may be rotating as indicated by an arrow 48. Grating surface 44 may be a separate strip affixed to body 46 or it may be grooves machined in the surface of body 46 either purposefully or by happenstance.

A receiving lens 50 and photodetector 42 are positioned to intercept selected ones of Bragg order reflections.

A laser 52 produces a coherent beam of light 54 which passes through a collimator 56 and polarizer 58. Laser 52 is preferably a cw gas laser such as a $CO_2$ laser or an argon-ion laser but a pulsed laser may be employed.

A beam splitter 60 produces beams 38' and 40' which pass through beam angle reducers 62 and 64 respectively. A mirror 66 directs beams 38' and 40' into a beam expander 68 and through optical wedges 70 and 72 which converge beams 38 and 40 in phase to the same spot 74 on surface 44. Not all of the optical components shown are essential for the proper operation of the present invention. In particular, collimator 56, beam angle reducer 62, mirror 66, and beam expander 68 are provided essentially for convenience in setting up a compact apparatus and may be omitted in a suitably arranged optical system.

Reflected light 76, representing at least one pair of Bragg diffraction orders reflected from surface 44 is focused by receiving lens 50 onto detector 42. The direction of reflected light 76 is typified by an arrow 78. Heterodyning in detector 42, which is a square law device, produces the Doppler difference frequency $\Delta\nu$ as previously described.

The Doppler frequency output of detector 42 is applied to an acoustic emission analyzer 80.

The nature of the acoustic emission signal depends on the material and operating conditions of body 46. If body 46 is at rest and completely unstressed (in the absence of metallurgical phase change, corrosion, etc.) acoustic emissions are unlikely. When body 46 is stressed such as, for example, by driving a load, acoustic emissions may be generated.

Referring to FIG. 6, a discrete acoustic emission, termed an event, can set up a detectable motion in the form of a wave in the surface such as shown at 82 at one micro-optical location, or fixed position on a given surface which may or may not be moving in a macro sense. As this wave train passes spot 74 (FIG. 5) at which measurement is being performed, a corresponding Doppler signal is generated and detected by detector 42. After passing spot 74, the surface motion may travel to a boundary of body 46 and be reflected so that the single acoustic emission event may give rise to further reduced amplitude measurable signal micro-optical trains such as at 84 and 86 that occurs at the same location (measurement volume) as 82 but later in time. In addition, depending on the nature of the material, its characteristics and the measurement device, a relatively long continued low amplitude ringing or background oscillation may be set up as at 88.

If body 46 is in motion such as, for example, rotary motion of a shaft, the acoustic emissions of FIG. 6 are superimposed on a relatively constant background velocity. The Doppler frequencies detected in detector 42 reflect these two types of components to provide a relatively constant frequency signal which may be frequency modulated by the acoustic emission.

One convenient and simple way of determining that an acoustic emission event has occurred, is to apply a threshold such as shown in dashed line in FIG. 6 to the acoustic emission signal from detector 42 and then to count the number of times the threshold is exceeded. In the example of FIG. 6, it will be noted that the subject single acoustic emission event gives rise to three counts, that is, the signal exceeds the threshold two times during its initial measurement at 82 and the reflection again exceeds the threshold at 84. In certain materials, a single acoustic emission event may give rise to from 1 to 1,000 or more counts per event. If the body is made of low-damping material such as steel, a large number of counts per event is to be expected whereas if the body is made of a relatively high-damping material such as fiber composite, a low number of counts per event is to be expected. One way which may be employed to eliminate the excess counts due to reflections is to apply time gating techniques. In gating techniques, when the acoustic emission if detected at 82, further counting is suppressed for a predetermined (dead) time. This technique has the disadvantage that new acoustic emission events occurring during the suppression time are missed. Other ways of analyzing the signal include measurement of the rise time of the leading edge of the signal or the duration of a period from the first to the last zero crossing or threshold crossing of the signal. A measure of the energy in the signal can be obtained by either squaring the electrical output of the detector or taking its absolute value and measuring the area under the resulting curve.

Referring now to FIG. 7, if the total counts or the counts per minute are represented against time as the stress on body 46 is increased, a rising curve is produced which approaches a vertical slope at impending failure. Monitoring of the counts or the count rate/in this manner can be used to predict failure of body 46 and to permit timely preventive maintenance.

Referring now to FIG. 8, a histogram of counts versus amplitude is shown typical of a composite material. In a composite material, three types of failure are to be expected. When the matrix supporting the fibers fails, low amplitude acoustic emission events are generated such as at 90. When the fibers themselves break, high amplitude events such as at 92 are generated. Finally, when the bond between the matrix and fibers is ruptured, acoustic event having intermediate amplitudes such as at 94 generate it. Thus, a characteristic trimodal distribution is produced for this type of material.

The preceding should not be taken as an exhaustive treatment of the manner in which the detected acoustic emission signals may be analyzed, but merely as an indication of the kinds of uses to which the powerful technique of measurement of acoustic emissions employing surface motion sensed by Doppler existing in Bragg acoustic orders may be put.

Figure 9:
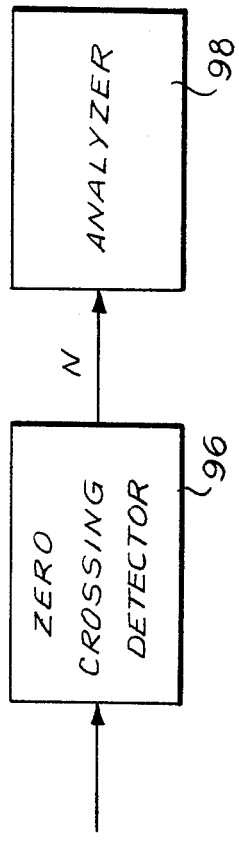
FIG. 9 is a block diagram of one type of acoustic emission analyzer of FIG. 5 especially suitable for detecting acoustic emissions producing surface waves in the surface of a stationary object.

One embodiment of an acoustic emission analyzer 80 which is especially adapted for use with acoustic emissions from a stationary object is shown in FIG. 9. The output of detector 42, which may have the shape of the signal in FIG. 6, is applied to a zero crossing detector 96. Zero crossing detector 96 produces an output count N or pulse each time the signal crosses zero in the positive or negative going direction. If the acoustic emission signal has a high enough frequency, the zero crossing counts N may be employed in an analyzer 98 to construct a histogram as shown in FIG. 8. If necessary, a threshold (FIG. 6) may be applied and the count may be limited to the number of times the signal exceeds the threshold.

Figure 10:
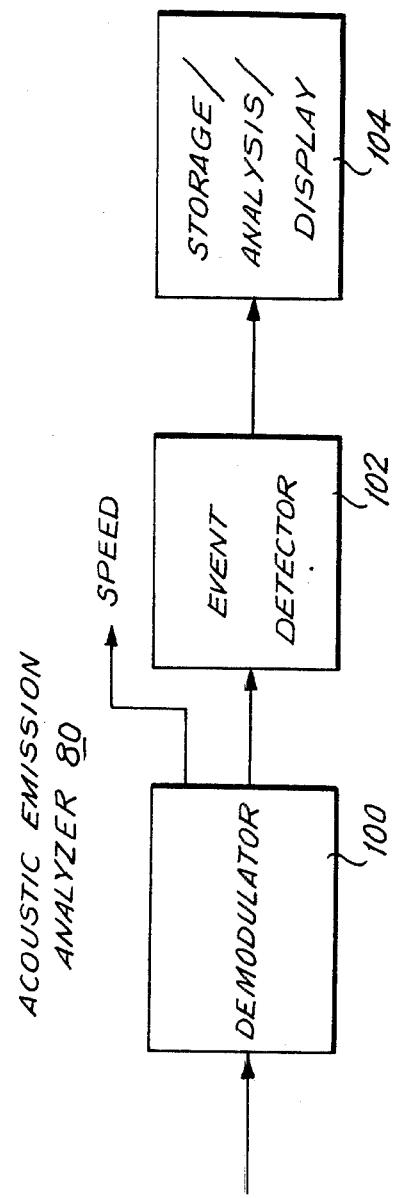
FIG. 10 is a block diagram of an acoustic emission analyzer suitable for use in the apparatus of FIG. 5 especially adapted for detecting surface waves due to acoustic emissions in the surface of a body which is itself in gross motion.

Referring now to FIG. 10, an acoustic emission analyzer 80 is shown especially adapted for use in a system in which the surface being observed is itself in motion. This may be, for example, when the surface is on a rotating shaft such as indicated in FIG. 5. A demodulator 100 may be employed to subtract the average speed of the surface and to produce an output corresponding to the acoustic emission component of FIG. 6 which is applied to an event detector 102 which may be, for example, a zero crossing detector such as 96 in FIG. 9, or other appropriate device. Event detector 102 provides a signal to a using element 104 which may be, for example, a storage device, an analysis device or a display. Demodulator 100 may also provide an output which indicates the average speed at which the surface is moving. Demodulator 100 may include, for example, a phase-locked loop appropriately filtered to track the frequency of the Doppler due to the average surface speed and to remove this average speed signal from the Doppler so that the signal transmitted to event detector 102 is essentially pure acoustic emission.

When event detection depends on a zero crossing detector, the frequency at which zero crossings are experienced can be increased by employing a higher Bragg order from the grating on the surface. This gives considerable freedom in selecting a Bragg order for detection which is especially well suited to frequency response for or other parameters of the detection system.

Finally, in situations where substantial low frequency background vibrations tend to be present in addition to acoustical emission pulses a problem may arise in attempting to separate these signals. Suppose for example that a background vibration of 1 mm occurs at 1 kHz. Then the Doppler shift corresponding to this is about 10 MHz. This 10 MHz peak modulation varies at the frequency of 1 kHz. However, a 10 Å, 1 $\mu$s pulse would produce an only 1 kHz Doppler shift peak, which is inadequate in terms of zero crossings to represent the 1 $\mu$s pulse behavior. To remove the frequency aliasing that results from this undersampling, the Doppler shifted signal must be augmented with additional zero crossings. This may be accomplished by inserting an optical modulator such as a Kerr cell or Bragg cell into one of the optical paths of the dual beam velocimeter or one path of the reference beam velocimeter (for example by actually placing it on the reference path). This would up-shift the Doppler signal by the optical modulation frequency. For example, with 80 MHz optical modulation frequency, adequate zero crossings should exist to fully demodulate the FM with sufficient resolution to represent both the 1 kHz and the 10 MHz signals in superposition. A simple linear filter can then be used to separate the "audio" and "video" components of this superposition.

From the above, it is apparent that although the invention has been described hereinbefore with respect to specific embodiments and preferred illustrations, it is evident that many modifications and changes may be made without departing from the spirit of the invention. Accordingly, by the appended claims, we intend to cover all such modifications and changes as fall within the true spirit and scope of this invention.

We claim:

1. Apparatus for sensing an acoustic emission event resulting in surface motion of a body comprising:
   a periodic grating-like structure on said surface, said grating-like structure being effective to provide a plurality of Bragg diffraction orders in response to an incident light beam;
   means for impinging a first beam of monochromatic light on said grating-like structure;
   a detector positioned to intercept at least one of said Bragg diffraction orders;
   means for providing a reference beam of monochromatic light to said detector, said reference beam heterodyning with said first beam in said detector whereby Doppler frequencies in said at least one Bragg diffraction order resulting from motion of said surface produced by said acoustic emission event is detected; and means responsive to said Doppler frequencies for measuring said surface motion Produced by said acoustic emission event.

2. Apparatus according to claim 1, wherein said means for providing a reference beam includes means for splitting a single beam of monochromatic light into said second beam on said grating-like structure at an angle which produces at least a second Bragg diffraction order directed to said detector, said at least a second Bragg diffraction order being said reference beam.

3. Apparatus according to claim 2, wherein said first beam is impinged on a spot on said grating-like structure at an angle on a first side of a normal to said surface at said spot and said second beam is impinged on said spot at said angle on an opposite side of said normal.

4. Apparatus according to claim 1, wherein said means for measuring includes a zero crossing detector.

5. Apparatus according to claim 4, wherein said detector is positioned to intercept a high enough Bragg diffraction order that said zero crossing detector is enabled to sense a sufficient number of zero crossings to measure said surface motion.

6. Apparatus according to claim 4, wherein said means for measuring includes an analyzer responsive to said zero crossing detector.

7. Apparatus according to claim 6, wherein said analyzer includes a spectrum analyzer effective to relate acoustic emission counts to amplitude.

8. Apparatus according to claim 1, wherein said means for measuring includes means for counting the number of times an amplitude of said surface motion exceeds a predetermined threshold to produce counts.

9. Apparatus according to claim 8, wherein said means for measuring includes means for accumulating said counts whereby impending failure of said body can be detected by increase in said counts.

10. Apparatus according to claim 1, wherein said surface is moving with a unidirectional velocity, said unidirectional velocity providing a first Doppler frequency in said detector and said surface motion of said body produces second Doppler frequencies which modulate said first Doppler frequency, and said means for measuring includes means for demodulating an output of said detector to recover said second Doppler frequencies.

11. Apparatus according to claim 10, wherein said means for measuring further includes means responsive to said second Doppler frequencies for sensing the occurence of an acoustic emission event.

12. Apparatus according to claim 1, 10 or 11, wherein said means for measuring further includes at least one of means for storing, analysis and display of data related to said acoustic emission event.

13. Apparatus for sensing an acoustic emission event resulting in surface motion of a stationary body comprising:

a periodic grating-like structure on said surface, said grating-like structure being effective to provide a plurality of Bragg diffraction orders in response to an incident light beam;

means for impinging a first beam of monochromatic light on said grating-like structure;

a detector positioned to intercept at least one of said Bragg diffraction orders;

means for providing a reference beam of monochromatic light to said detector, said reference beam heterodyning with said first beam in said detector whereby Doppler frequencies in said at least one Bragg diffraction order resulting from motion of said surface produced by said acoustic emission event is detected; and means responsive to said Doppler frequencies for measuring said surface motion produced by said acoustic emission event.

14. Apparatus for sensing an acoustic emission event resulting in surface motion of a body, said body being movable at an average speed comprising:

a periodic grating-like structure on said surface, said grating-like structure being effective to provide a plurality of Bragg diffraction orders in response to an incident light beam;

means for impinging a first beam of monochromatic light on said grating-like structure;

a detector positioned to intercept at least one of said Bragg diffraction orders;

means for providing a reference beam of monochromatic light to said detector, said reference beam heterodyning with said first beam in said detector whereby Doppler frequencies in said at least one Bragg diffraction order resulting from motion of said surface is detected;

said average speed providing a first Doppler frequency in an output of said detector, said surface motion resulting from said acoustic emission event providing second Doppler frequencies which second Doppler frequencies modulate said first Doppler frequency in said output of said detector;

means for demodulating said output of said detector to recover said second Doppler frequencies; and means responsive to said second Doppler frequencies for measuring said surface motion produced by said acoustic emission event.

15. A method for measuring an acoustic emission event resulting in surface motion of a body, comprising:

disposing a periodic grating-like structure on said surface, said grating-like structure being effective to provide a plurality of Bragg diffraction orders in response to an incident light beam;

impinging a first beam of monochormatic light on said grating-like structure to produce said plurality of Bragg diffraction orders;

said Bragg diffraction orders;

deriving a reference beam from said first beam;

heterodyning the intercepted Bragg diffraction order with said reference beam to produce a Doppler signal responsive to said surface motion produced by said acoustic emission event; and measuring said surface motion in response to said Doppler signal produced by said acoustic emission event.

16. A method according to claim 15, wherein the step of measuring includes counting the number of times an output of said detector crosses zero.

17. A method according to claim 15, wherein the step of measuring includes counting the number of times an amplitude of said Doppler signal exceeds a predetermined threshold.

18. A method for measuring an acoustic emission event resulting in surface motion of a surface of a body said surface being movable at an average speed, comprising:

disposing a periodic grating-like structure on said surface, said periodic grating-like structure being effective to provide a plurality of Bragg diffraction orders in response to an incident light beam;

impinging a first beam of monochromatic light on said grating-like structure to produce said plurality of Bragg diffraction orders;

positioning a detector to intercept at least one of said Bragg diffraction orders;

deriving a reference beam from said first beam;

heterodyning the intercepted Bragg diffraction order with said reference beam to produce a first Doppler signal responsive to said average speed and a second Doppler signal modulating said first Doppler signal responsive to surface motion resulting from said acoustic emission event;

demodulating the heterodyned signal to recover an acoustic emission signal related to said second Doppler signal; and measuring said surface motion produced by said acoustic emission event based on said acoustic emission signal.

* * * * *